United States Patent [19]

Pav et al.

[11] 4,328,744
[45] May 11, 1982

[54] ROLL FOR USE IN CALENDERS OR THE LIKE

[75] Inventors: Josef Pav, Krefeld; Dieter Junk, Kreuztal, both of Fed. Rep. of Germany

[73] Assignee: Kleinewefers GmbH, Krefeld, Fed. Rep. of Germany

[21] Appl. No.: 196,123

[22] Filed: Oct. 10, 1980

[30] Foreign Application Priority Data

Oct. 17, 1979 [DE] Fed. Rep. of Germany ....... 2942002

[51] Int. Cl.$^3$ ......................... B30B 3/04; B21B 13/02
[52] U.S. Cl. ............................ 100/162 B; 29/116 AD
[58] Field of Search ............. 100/162 B; 29/116 AD, 29/113 AD, 116 R

[56] References Cited

U.S. PATENT DOCUMENTS

| | | | |
|---|---|---|---|
| 2,395,915 | 3/1946 | Specht | 29/116 AD X |
| 3,131,625 | 5/1964 | Kusters et al. | 29/116 AD X |
| 3,587,152 | 6/1971 | Hold | 29/116 AD |
| 4,064,607 | 12/1977 | Wolf | 29/116 AD |
| 4,228,571 | 10/1980 | Biondetti | 29/116 AD |
| 4,280,262 | 7/1981 | Ahrweiler | 29/116 AD |

Primary Examiner—Peter Feldman
Attorney, Agent, or Firm—Kontler & Grimes

[57] ABSTRACT

A rotary pressure applying roll which defines with a parallel complementary roll a nip for a running web of paper, textile or other flexible sheet material in a calender or the like has a cylindrical shell surrounding a stationary carrier in the form of a rigid shaft. A bearing element is installed between the shell and the carrier and several hydraulic pressure generating devices are mounted between the carrier and the bearing element to urge the latter against the internal surface of the shell. The pressure generating devices are spaced apart from each other, as considered in the circumferential direction of the shell, and the cylinder chamber of each such device can receive pressurized hydraulic fluid at a different pressure. The axis of a main pressure generating device is normally located in the common plane of the axes of the shell and of the complementary roll. The other device or devices are installed at the one and/or the other side of such plane and can be operated to counteract forces acting substantially tangentially of the shell. The carrier and the bearing element have cooperating spherical, flat and/or cylindrical guide faces which enable the bearing element to pivot about an axis that is parallel to the axis of the shell.

32 Claims, 13 Drawing Figures

ROLL FOR USE IN CALENDERS OR THE LIKE

BACKGROUND OF THE INVENTION

The present invention relates to rolls which can be used in calenders or analogous machines to apply pressure to running webs of paper or textile, metallic foils or foils or synthetic plastic material. More particularly, the invention relates to improvements in means for enhancing the resistance of relatively long and heavy metallic rolls to flexure and/or other deforming or displacing stresses. Still more particularly, the invention relates to rolls of the type wherein a hollow cylindrical shell spacedly surrounds a stationary carrier in the form of a shaft, rod, bar or the like.

It is already known to guide a web of paper, textile material or the like through the nip of two rolls at least one of which has a hollow cylindrical shell whose external surface contacts the running web and whose internal surface spacedly surrounds a stationary carrier. At least one bearing element is installed in the hollow shell and has an outer surface bearing against the internal surface of the shell under the action of a hydraulic pressure generating device which operates between the carrier and the bearing element to counteract the forces which develop when the two rolls bear against the opposite sides of a running web therebetween. A hydrostatic seal is or can be provided between the outer surface of the bearing element and the internal surface of the shell so that the latter need not rub directly against the bearing element while rotating about its axis, either in response to transmission of torque from a suitable prime mover or in response to lengthwise movement of the running web. The outer surface of the bearing element normally extends well beyond the aforementioned pressure generating device, as considered in the circumferential direction of the shell, and the bearing element has a guide face which cooperates with and can move relative to a complementary guide face of the carrier to counteract forces which are applied to the roll in a direction substantially tangentially of the shell.

Rolls of the just outlined character can be used in calenders, in other ironing or smoothing machines, in pressure-applying units of papermaking, cellulose processing and printing machines, as well as in rolling mills for synthetic plastic materials, steel or the like.

German Auslegeschrift No. 1,193,792 discloses a roll wherein the pressure generating means comprises several hydraulic units and means for supplying such units with hydraulic fluid at a given pressure, i.e., the pressure of fluid supplied to each of several units is the same. The units are disposed in a row extending in parallelism with the axis of the shell, and their purpose is to prevent flexing of the shell as well as to uniformize the pressure between the external surface of the shell and the running web of flexible material which is caused to pass between the shell and the associated cooperating complementary roll. Each unit has a plunger which is rigidly secured to the bearing element and extends into a cylinder chamber which is machined into the carrier. In order to increase the area of contact (either directly or by way of the aforementioned hydrostatic seal) between the bearing element and the internal surface of the shell, the bearing element normally extends well beyond both sides of each hydraulic unit, as considered in the circumferential direction of the shell. The aforementioned hydrostatic seal comprises several recesses in the outer surface of the bearing element and means for filling the recesses with a pressurized friction-reducing medium, e.g., oil.

In a machine which employs rolls of the just outlined character, the shell is often subjected to the action of pronounced forces which act substantially tangentially of the shell, i.e., at right angles to the plane including the axes of the shell and of the associated complementary roll. Such tangential forces develop primarily as a result of frictional engagement between the external surface of the shell and the running web or between the external surface of the shell and the external surface of the complementary roll. The just discussed tangential forces are especially pronounced if the shell is driven by a prime mover to advance the web lengthwise and to thereby indirectly rotate the complementary roll. Additional transverse or tangential forces develop under the weight of the shell, especially when the aforementioned common plane of the axes of the shell and the complementary roll is not vertical. The transverse forces tend to or actually bend or flex the shell at right angles to the aforementioned common plane with the result that the line of contact between the shell and the running web is shifted to one side of such plane, i.e., flexing of the shell entails a change in the configuration of the nip between the shell and the complementary roll.

Any changes in the configuration of the nip are highly undesirable in many types of machines in which a roll of the just outlined character is put to use. Thus, the thickness of the web which travels between the shell and the complementary roll is not uniform, as considered in the axial direction of the shell, if the configuration of the nip is changed because this invariably entails changes in the width of the clearance between the shell and the complementary roll. Consequently, the thickness of a paper web in a calender is likely to vary in a direction from one toward the other marginal portion of the web if the shell is allowed to flex and/or to undergo other types of deformation in response to the application of stresses acting at right angles to or having components acting at right angles to the plane (hereinafter called pressure plane) which includes the axes of the shell and of the complementary roll. Such forces or stresses cause the bearing element in the interior of the shell to move sideways, i.e., at right angles to the pressure plane, except if the aforementioned cylinder chamber can hold the plunger of the hydraulic pressure generating unit against any and all movements transversely of the axis of the plunger. If the bearing element cannot yield by moving sideways, it is subjected to very pronounced tilting stresses which are applied by the rotating shell and tend to change the orientation of the bearing element with reference to an axis which is parallel to the axis of the shell. This leads to jamming of the shell and/or of the plunger in the cylinder chamber with attendant adverse influence on normal operation of the hydraulic pressure generating unit. Moreover, the outer surface of the bearing element does not conform to the internal surface of the shell so that the pressurized fluid can escape from the aforementioned recesses of the hydrostatic seal between the internal surface of the shell and the adjacent outer surface of the bearing element. This, in turn entails pronounced losses in pressurized hydraulic fluid and reduces the quality of lubrication between the surfaces of the bearing element and the shell.

German Offenlegungsschrift No. 2,259,035 discloses a modified roll wherein the shell confines a bearing element which is biased away from the stationary carrier and against the internal surface of the rotating shell by at least two hydraulic pressure generating devices which are spaced apart, as considered in the axial direction of the shell. This publication further discloses the possibility of fixedly mounting the plungers of the pressure generating devices in the carrier and providing the cylinder chambers for such plungers in the stationary carrier. The diameters of surfaces surrounding the cylinder chambers exceed the diameters of the respective plungers, and the plungers are surrounded by elastic sealing rings so that each plunger has a certain freedom of tilting movement in the respective cylinder chamber. In other words, the bearing element can be tilted with reference to the carrier about an axis which is parallel to the axis of the shell. This enables the bearing element to yield to transverse forces so as to avoid jamming of plungers in the respective cylinder chambers. The just discussed roll exhibits the drawback that the shell readily yields to tangential and other forces which act thereon in a direction at right angles to the pressure plane including the axes of the shell and the complementary roll, i.e., the configuration and location of the nip between the shell and the complementary roll are unstable. Moreover, once the bearing element is tilted in response to the application of one or more transverse forces, the direction in which the pressure generating devices act to urge the bearing element against the internal surface of the shell is shifted to one side of the aformentioned pressure plane which entails additional deformation of the shell and attendant distortion of the nip between the shell and the complementary roll.

German Offenlegungsschrift No. 2,625,048 discloses a roll with several pairs of hydraulic pressure generating devices between the carrier and the bearing element in the interior of the rotating shell. The devices of each pair have axes which extend radially of the shell and are located in different planes each of which is normal to the axis of the shell. Also, the devices of each pair are mirror symmetrical to each other with reference to the pressure plane which includes the axes of the shell and of the complementary roll. Such design also fails to compensate for transverse stresses, i.e., for forces which act at right angles to the pressure plane. Moreover, the just discussed roll exhibits the drawback that the shell is likely to be flattened between the pressure generating devices of each pair, i.e., in the region where the aforementioned pressure plane intersects the shell. This, in turn, results in pronounced contact between the shell and the running web, i.e., the contact is changed from a linear contact to a surface-to-surface contact which is highly undesirable in connection with the treatment of many types of web-, strip- or tape-like materials including paper, textiles, metallic foils and plastic foils.

OBJECTS AND SUMMARY OF THE INVENTION

An object of the invention is to provide a novel and improved roll which can be used in calenders or the like and is constructed and assembled in such a way that its useful life is much longer than that of conventional rolls.

Another object of the invention is to provide a roll whose construction is such that it generates less heat than heretofore known rolls which are equipped with deformation-compensating and/or displacement-preventing means for their shells.

A further object of the invention is to provide a roll whose shell can stand substantial transverse stresses which tend to shift the shell laterally and/or to flex the median and/or other portions of the shell.

An additional object of the invention is to provide a roll wherein the deformation of the shell can be prevented or reduced to an acceptable value without affecting the compensation for pressure which a complementary roll exerts in a plane including the axes of the two rolls.

Another object of the invention is to provide a roll of the above outlined character with novel and improved means for maintaining the orientation of the bearing element or elements between the shell and the carrier in a simple and inexpensive way.

A further object of the invention is to provide the roll with novel and improved bearing elements and with novel and improved means for establishing and maintaining reliable hydrostatic seals between the bearing element or elements and the rotating shell of the roll.

Another object of the invention is to provide a roll which operates satisfactorily regardless of whether the common plane of its axis and the axis of the associated complementary roll is or is not vertical.

A further object of the invention is to provide the roll with novel and improved means for controlling the tilting movements of the bearing element or elements relative to their carrier.

An ancillary object of the invention is to provide the roll with novel and improved means for supplying pressurized fluid to the pressure generating means between the carrier and the bearing elements(s) and/or between the bearing element(s) and the shell.

A further object of the invention is to provide a roll wherein the end portions of the shell need not be mounted on or in bearings.

Another object of the invention is to provide a roll which can be installed in many presently known calenders or analogous machines as a superior substitute for conventional rolls.

An additional object of the invention is to provide a roll which can define with an associated complementary roll a nip of predetermined shape for long periods of time and which ensures that not only the configuration but also the position of the nip remains unchanged as long as the roll is in use.

Another object of the invention is to provide the roll with novel and improved means for automatically or manually commmpensating for tangential or similarly oriented forces which develop when the roll is in use and tend to shift portions of or the entire shell in a direction transversely of the direction of forces which urge the roll against the cooperating complementary roll or against a flat body which is introduced into the nip of such rolls.

The invention resides in the provision of a pressure applying roll for use in calenders or the like to define with a parallel complementary roll a nip for the passage of a web of paper, textile or other material. The roll comprises a hollow cylindrical rotary shell having an internal surface, a stationary carrier which extends through and is spacedly surrounded by the shell, bearing means including at least one bearing element interposed between the carrier and the shell and having a second surface complementary to and adjacent to the internal surface of the shell, and a plurality of fluid-operated pressure generating devices including first and second devices. The pressure generating devices are operable to urge the second surface (of the bearing element) against the internal surface of the shell, and the first and second devices are spaced apart from each other, as considered in the circumferential direction of the shell. The roll further comprises means for operating the pressure generating devices including means for supplying to each of these devices pressurized fluid at a selected pressure, i.e., the pressure of fluid which is supplied to any one of the pressure generating devices need not be the same as the pressure of fluid that is supplied to the other device or devices. In other words, the operating means may include means for supplying fluid to the first pressure generating device at at least one first pressure and means for supplying fluid to the second pressure generating device at at least one second pressure which is different from the first pressure. The first pressure generating device may constitute a primary or main pressure generating device which counteracts the force acting in a pressure plane that is common to the axes of the shell and of the complementary roll, and the second pressure generating device then constitutes an auxiliary pressure generating device which generates forces serving to counteract the forces acting upon the shell in a direction substantially at right angles to the just mentioned pressure plane and tending to deform the median portion of the shell (if the end portions of the shell are mounted in or on bearings) or to shift the entire shell sideways.

The novel features which are considered as characteristic of the invention are set forth in particular in the appended claims. The improved roll itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figures 1, 1A, 2, 3, 4:
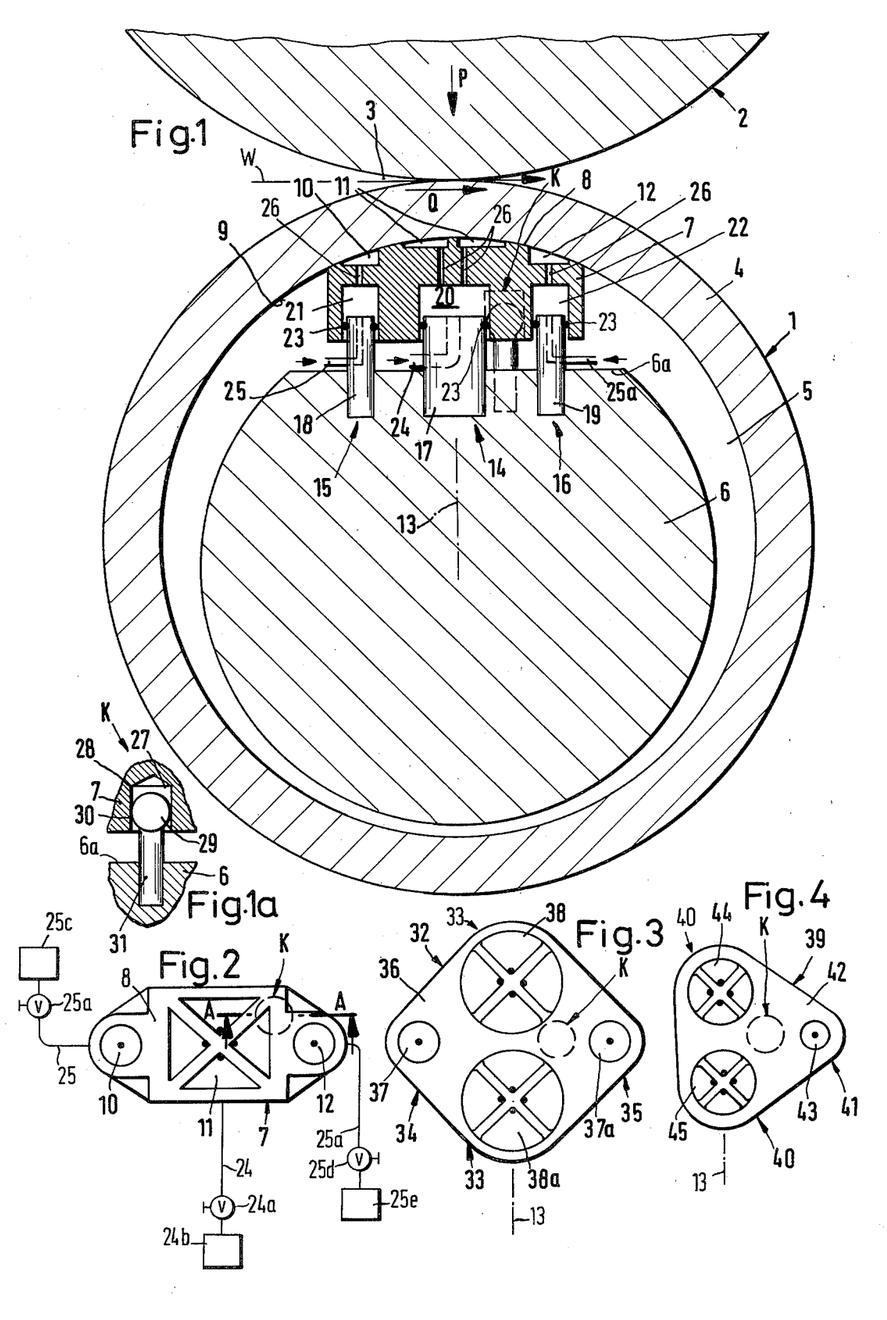
FIG. 1 is a transverse vertical sectional view of a roll which embodies one form of the invention and of an associated complementary roll.
FIG. 1a is a fragmentary sectional view as seen in the direction of arrows from the line A—A of FIG. 2.
FIG. 2 is a plan view of the bearing element in the roll of FIG. 1.
FIG. 3 is a plan view of a modified bearing element for use in a roll wherein the primary pressure generating device comprises two hydraulic pressure generating units.
FIG. 4 is a plan view of a further bearing element for use in a roll wherein the primary pressure generating device comprises two hydraulic pressure generating units and the auxiliary pressure generating means includes a single hydraulic pressure generating unit.

Referring first to FIG. 1, there is shown a portion of a machine (e.g., a calender) which comprises a pressure applying roll 1 including a hollow cylindrical shell 4 which cooperates with a parallel complementary roll 2 to exert pressure against the underside of a running web W of paper, textile material, metallic foil or synthetic plastic material. The web W travels through the nip 3 of the rolls 1 and 2 in a direction to the left or to the right, as viewed in FIG. 1. The roll 1 bears against the upper side of the web W with a force P acting in a (pressure) plane 13 which includes the axes of the rolls 1 and 2, i.e., the axis of the roll 2 and the axis of the shell 4. The means for driving the roll 1 and/or 2 as to advance the web W in the desired direction is not specifically shown in the drawing. Such means for driving may include a set of mating gears which are installed in the frame of the calender and rotate the rolls 1 and 2 in opposite directions. If only the roll 1 or 2 is driven, the other roll is rotated by the web W.

Figures 5, 6, 7, 8:
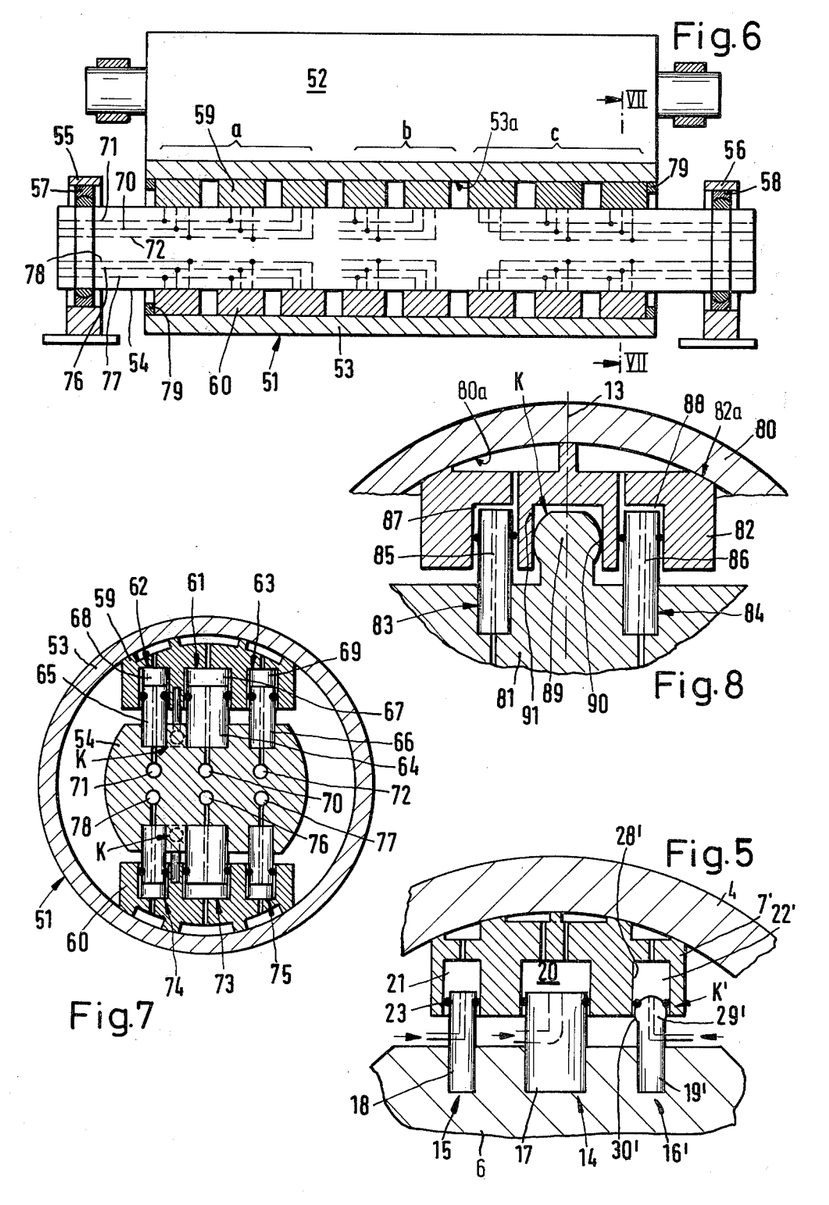
FIG. 5 is a fragmentary transverse vertical sectional view of a roll which constitutes a modification of the roll shown in FIG. 1 and wherein the joint between the bearing element and the carrier is incorporated in one of the auxiliary pressure generating devices.
FIG. 6 is a schematic axial sectional view of a further roll which comprises two rows of bearing elements disposed diametrically opposite each other and wherein the end portions of the shell are not mounted on bearings.
FIG. 7 is an enlarged transverse vertical sectional view as seen in the direction of arrows from the line VII—VII of FIG. 6.
FIG. 8 is a fragmentary transverse vertical sectional view of a further roll wherein the joint between the bearing element and the carrier is installed intermediate the primary and auxiliary pressure generating devices and in the pressure plane including the axes of the shell and of the associated complementary roll.

The internal space 5 of the shell 4 receives, with clearance, a stationary carrier 6 in the form of an elongated horizontal shaft having at its upper side a flat 6a. The end portions (not shown) of the carrier 6 are mounted in the machine frame, e.g., in a manner as shown in FIG. 6 for the carrier 54. A bearing element 7 is interposed between the flat 6a of the carrier 6 and the internal surface 9 of the shell 4. The bearing element 7 has an outer or upper surface 8 which is adjacent to the corresponding portion of the internal surface 9, substantially between the eleven and one o'clock positions, as viewed in FIG. 1. In order to establish a hydrostatic seal between the surfaces 8 and 9, the surface 8 has several recesses or pockets including at least two centrally located recesses 11 and two outer recesses 10, 12. The recesses 10-12 are filled with a pressurized hydraulic fluid, e.g., oil, which prevents direct frictional engagement between the surfaces 8, 9 and enables the shell 4 to rotate with a minimum of friction.

The roll 1 further comprises several fluid-operated pressure generating devices including a main or primary pressure generating device 14 and two auxiliary or secondary pressure generating devices 15, 16. The devices 15, 16 are disposed at the opposite sides of and are mirror symmetrical to each other with reference to the pressure plane 13 including the axes of the shell 4 and roll 2. The axis of the primary pressure generating device 14 is located in the pressure plane 13. Each of the pressure generating devices 14–16 comprises a plunger (respectively shown at 17, 18 and 19) extending into a complementary cylinder chamber (respectively shown at 20, 21 and 22) machined into the underside of the bearing element 7. The plungers 17–19 are fixedly mounted or anchored in the carrier 6 and extend upwardly beyond the flat 6a and into the respective cylinder chambers 20–22. It will be noted that the diameter of the plunger 17 greatly exceeds the diameters of the plungers 18, 19; the diameter of the plunger 18 may but need not necessarily match that of the plunger 19. FIG. 1 shows that the diameters of the cylinder chambers 20–22 appreciably exceed the diameters of the respective plungers 17–19 so that the bearing element 7 can be tilted relative to the carrier 6 about an axis which is parallel to the axes of the shell 4 and complementary roll 2. Each plunger is surrounded by at least one elastic sealing ring 23 which sealingly engages the surface bounding the respective cylinder chamber so as to prevent escape of pressurized hydraulic fluid from the upper portions of the cylinder chambers 20–22 as well as from the recesses 10–12 which are communicatively connected with the nearest chambers by conduits in the form of channels 26 machined into the bearing element 7. The cylinder chamber 21 communicates with the recess 10; the two or more recesses 11 communicate with the cylinder chamber 20; and the recess 12 communicates with the cylinder chamber 22. The cylinder chamber 20 can receive pressurized fluid from a first source 24b (see FIG. 2) by way of a conduit 24 which contains suitable pressure regulating means 24a, e.g., an adjustable flow restrictor or a pressure regulating valve. Analogously, the cylinder chamber 21 receives pressurized hydraulic fluid from a source 25c by way of a conduit 25 which contains an adjustable pressure regulating device 25b. The cylinder chamber 22 receives pressurized hydraulic fluid from a source 25e via conduit 25a which contains an adjustable pressure regulating device 25d. This enables an attendant or an automatic control unit to change the pressure of fluid in the cylinder chamber 20 independently of fluid pressure in the cylinder chamber 21 and/or 22 and to ensure that the pressure in the cylinder chamber 20 is different from that in the other cylinder chamber or chambers.

The roll 1 further comprises a joint K which enables the bearing element 7 to swivel or pivot (within limits) with reference to the carrier 6 about an axis extending in parallelism with the axis of the roll 1 or 2. The details of the joint K are shown in FIG. 1a. This joint comprises a bore or socket 27 which is machined into the underside of the bearing element 7 and receives an extension of the carrier 6, namely, a spherical head 29 at the upper end of a shank 31 which is anchored in the carrier 6 and extends upwardly and beyond the flat 6a. The surface 30 of the sphere constitutes a guide face which can be said to form part of the carrier 6 and cooperates with a cylindrical guide face 28 surrounding the socket 27 in the underside of the bearing element 7. The clearance between the surface 30 of the sphere 29 and the surface 28 of the socket 27 is so small that the bearing element 7 can be tilted about an axis extending at right angles to the plane of FIG. 1a and including the center of the sphere 29 but the bearing element 7 cannot be shifted sideways (in a direction to the left or to the right, as viewed in FIG. 1a) with reference to the carrier 6. The guide faces 28, 30 of the joint K are disposed within the confines of the bearing element 7.

As a rule, only one of the rolls 1, 2 is driven so that the other roll is rotated by the web W which travels through the nip 3. In other words, friction between the web W and the roll 1 or 2 which is not positively driven by a prime mover (e.g., through the interposition of a gear transmission, a chain transmission or the like) is sufficiently pronounced to entail the generation of a transverse force Q which acts substantially tangentially of the shell 4 and at right angles to the pressure plane 13 including the axes of the rolls 1 and 2. If the end portions of the shell 4 are rotatably mounted on antifriction bearings (not shown in FIG. 1) and if the web W travels in a direction to the right, as viewed in FIG. 1, the force Q tends to bend or flex the median portion of the shell 4 (namely, the portion which is located midway between the bearings for its end portions) in a direction to the right. Such flexing of the shell 4 would cause a highly undesirable deformation of the nip 3 and the resulting unsatisfactory treatment of the web W during passage through the nip. Flexing or shifting of the median portion of the shell 4 could not be prevented by the main or primary pressure generating device 14 alone. Any shifting of the median portion of the shell 4 in a direction to the right, as viewed in FIG. 1, would result in displacement of the bearing element 7 in the same direction so that the peripheral surface of the plunger 17 forming part of the main or primary pressure generating device 14 (it being assumed now that the auxiliary or secondary pressure generating devices 15 and 16 are omitted) would strike against the surface bounding the cylinder chamber 20. Once the plunger 17 would move into contact with the surface around the cylinder chamber 20, the bearing element 7 would be subjected to tilting forces which could destroy the action of the hydrostatic seal between the surfaces 8 and 9 and which could also cause the shell 4 to jam.

In accordance with a feature of the invention, the just mentioned flexing of the median portion of the shell 4 (such bending or flexing would take place in the absence of the auxiliary pressure generating devices 15 and 16) is prevented or minimized in that the guide faces 28 and 30 of the joint K are in sliding contact with each other whereby the carrier 6 takes up the force Q and prevents any or any appreciable flexing of the median portion of the shell 4. If the end portions of the shell 4 are not mounted on antifriction or friction bearings, the force Q does not tend to flex or bend the median portion of the shell; instead, such force tends to shift the entire shell 4 in the direction of transport of the web W. Tilting of the bearing element 7 relative to the carrier 6 is prevented by the auxiliary pressure generating device 15 or 16 which receives fluid at such pressure that it generates a force opposing the tilting moment upon the bearing element 7. If the force Q is very pronounced, the magnitude of the opposing force (generated by the device 15 or 16 and opposing the tilting moment upon the bearing element 7) can be selected in such a way that the bearing element is tilted in the opposite direction, namely, counter to the direction in which the element 7 would tend to pivot in the absence of the auxiliary pressure generating device 15 or 16. The force which is generated by the device 15 or 16 (depending upon whether the web W travels in a direction to the left or to the right, as viewed in FIG. 1) invariably prevents any shifting or flexing of the shell 4 in a direction at right angles to the pressure plane 13, i.e., the median portion of the shell 4 is not flexed or the entire shell 4 is not moved sideways if the pressure in the cylinder chamber 21 or 22 is sufficient to effectively oppose the force Q.

If the opposing force which is generated by the auxiliary device 15 or 16 is sufficiently pronounced to tilt the bearing element 7 counter to the direction of tilting action of the transverse force Q, the opposing force which is generated by the device 15 or 16 has a component acting counter to the direction of action of the force Q; such component reliably prevents any shifting of the median portion of or the entire shell 4 in the direction of action of the tangential force Q.

As mentioned above, only one of the auxiliary pressure generating devices 15, 16 is used at any time, depending on the direction of transport of the web W, i.e., depending on the direction of rotation of the shell 4. Eventual minor flexing or shifting of the shell 4 in response to the action of the force Q can be compensated for by the joint K, i.e., this joint allows for some tilting of the bearing element 7 so that the orientation of the outer surface 8 relative to the internal surface 9 of the shifted or flexed shell 4 remains at least substantially unchanged.

FIG. 2 shows that the cylinder chamber 20 of the primary pressure generating device 14 can supply pressurized hydraulic fluid to a cluster of as many as four recesses 11 in the outer surface 8 of the bearing element 7. The recesses 11 are triangular whereas the recesses 10 and 12 are shallow pockets having circular outlines.

In the improved roll, the bearing element 7 can take up the major part of the tangential force Q (such force is transmitted thereto by the shell 4), and its guide face 28 transmits such force to the carrier 6 via guide face 30 of the sphere 29. The resulting unavoidable moment which tends to tilt the bearing element 7 relative to the carrier 6 is opposed by the fluid in the cylinder chamber 21 or 22, depending on the direction of rotation of the shell 4. It has been found that the auxiliary pressure generating device 15 or 16 invariably prevents jamming of the sphere 29 in the socket 27 and/or undesirable contact between the plunger of a pressure generating device and the surface surrounding the respective cylinder chamber. The force which is generated by the active auxiliary pressure generating device 15 or 16 has a component which acts counter to the tangential force Q. In view of such compensation for the action of the force Q, the shell 4 is much less likely to be shifted at right angles to its axis or to be flexed between its end portions, and the just mentioned compensation does not affect the operation of the primary pressure generating device 14 which supplies a force opposing the force P and urging the shell 4 into requisite contact with the web W.

The provision of a joint K which includes a spherical guide face and a cooperating cylindrical guide face is preferred in many presently utilized rolls which embody the present invention because such joint is compact and allows for tilting (when necessary) of the bearing element 7 relative to the carrier 6 about an axis that is parallel to the axis of the shell 4. Moreover, the joint K (or an equivalent joint which allows for tilting of the bearing element 7 about an axis extending in parallelism with the axis of the shell 4) renders it possible to intentionally tilt the bearing element by way of the auxiliary pressure generating device 15 or 16 counter to the direction in which the bearing element would be tilted by the force Q. This renders it possible to stabilize, practically under any anticipated circumstances, the position of the bearing element 7 with reference to the carrier 6, i.e., to stabilize the position of the shell 4 with reference to the carrier 6 and with reference to the cooperating complementary roll 2. Tiltability of the bearing element 7 (i.e., the provision of the joint K or an equivalent joint) further ensures that the outer surface 8 of the bearing element 7 invariably remains immediately adjacent to the internal surface 9 of the shell 4, i.e., that the escape of fluid from the hydrostatic sealing means including the recesses 10–12 is much less pronounced than in heretofore known rolls.

The spherical joint K of FIG. 1a further enables the bearing element 7 to turn, within limits, about an axis which is normal to the pressure plane 13. Therefore, the bearing element 7 cannot be influenced by eventual flexing or bending of the carrier 6, and the center of curvature of its outer surface 8 can always coincide with the center of curvature of the adjacent portion of the internal surface 9.

The feature that the joint K is separate and discrete from the pressure generating devices 14–16 is desirable and advantageous in many rolls which embody the present invention. Thus, and since the pressure generating devices 14–16 need not perform any guiding functions, they can be readily equipped with elastic sealing means such as the sealing rings 23 shown in FIG. 1. The sealing rings 23 merely perform their basic function of preventing escape of fluid from the respective cylinder chambers 20–22 but need not be subjected to any pronounced deforming or squeezing stresses so that their useful life is a multiple of the useful life of elastic sealing rings in conventional rolls.

Since the guide faces 28 and 30 of the joint K are disposed within the confines of the bearing element 7, the tilting moment to which the bearing element 7 is subjected by the shell 4 is relatively small. Consequently, the dimensions of the auxiliary pressure generating devices 15 and 16 can be reduced accordingly, i.e., the diameters of the plungers 18 and 19 can be much smaller than the diameter of the plunger 17.

The placing of the primary pressure generating device 14 between the auxiliary pressure generating devices 15, 16 in such a way that the axis of the plunge 17 is located in the pressure plane 13 and that the devices 15, 16 are mirror symmetrical to each other with reference to the plane 13 also exhibits several advantages, at least in certain embodiments of the improved roll. For example, the controls for the pressure generating device 15 may be identical with those for the device 16 if these devices are located at the same distance from the plane 13 and must furnish forces of identical magnitude to counteract the force Q or a force acting in the opposite direction if the direction of lengthwise movement of the web W is reversed. Moreover, such distribution of the pressure generating devices 14–16 simplifies the operation involving a change in the direction of movement of the web from leftwards to rightwards or vice versa. If desired, all three pressure generating devices 14–16 can be operated simultaneously; the auxiliary pressure generating devices then assist the primary pressure generating devices in generating a force which opposes the force P and one of the auxiliary pressure generating devices further performs its normal function of opposing the force Q. The placing of all three pressure generating devices close to each other and their mounting in such a way that the axes of the devices 15, 16 are parallel to the axis of the device 14 reduces the space requirements of the bearing element and of the pressure generating means. The carrier 6 can support two or more bearing elements 7 or equivalent bearing elements which form a row extending in parallelism with the axis of the shell 4 (see FIG. 6).

In the embodiment of FIG. 3, the main or primary pressure generating device (which replaces the device 14 of FIG. 1) comprises two discrete units 33 each having its own plunger anchored in the carrier and extending with clearance into a cylinder chamber of the square or substantially square bearing element 32. The axes of the plungers forming part of the units 33 are disposed in the pressure plane 13, i.e., in that plane which includes the axes of the two rolls. Each of the two auxiliary pressure generating devices 34, 35 comprises a single plunger and a single cylinder chamber. These auxiliary pressure generating devices flank the main pressure generating device including the two units 33 and they are disposed at the opposite sides of and are mirror symmetrical to each other with reference to the pressure plane 13. The hydrostatic seal between the bearing element 32 and the internal surface of the shell (not shown in FIG. 3) comprises two relatively small circular recesses 37, 37a which are machined into the outer surface 36 of the bearing element 32 and respectively communicate with the cylinder chambers of the auxiliary pressure generating devices 34, 35, as well as two sets or clusters of four larger recesses 38, 38a which respectively reeive pressurized fluid from the adjacent units 33 of the primary pressure generating device. The joint K (indicated by a broken-line circle) is located at the right-hand side of the pressure plane 13, as viewed in FIG. 3, and the center of its sphere is preferably located in the plane including the axes of the plungers forming part of the auxiliary pressure generating devices 34, 35.

As a rule, the diameter of the plunger of the primary pressure generating device is greater than the diameter of the plunger of an auxiliary pressure generating device. The same result can be achieved by using plungers of identical diameters but by employing a primary pressure generating device which consists of several units each having a plunger and a cylinder chamber.

FIG. 4 shows a bearing element 39 having a substantially triangular outline. The main pressure generating device comprises two units 40 and the roll including the structure of FIG. 4 has a single auxiliary pressure generating device 41 disposed at one side of the pressure plane 13 incuding the axes of the plungers forming part of the units 40. The outer surface 42 of the bearing element 39 has a recess 43 which is a circular depression and communicates with the cylinder chamber of the auxiliary pressure generating device 41. In addition, the outer surface 42 has two sets or clusters 44, 45 of four recesses each which receive pressurized hydraulic fluid from the cylinder chambers forming part of the corresponding (nearest) units 40. The bearing element 39 of FIG. 4 can be used with advantage in a roll whose shell invariably rotates in a single direction. This is tantamount to omission of the auxiliary pressure generating device 15 or 16 of FIG. 1. Moreover, the structure of FIG. 4 can be used in a roll wherein the direction of action of the transverse or tangential force Q does not change, i.e., wherein the force Q invariably acts in such direction that it can be effectively opposed by pressurized fluid in the cylinder chamber of a single auxiliary pressure generating device.

FIG. 5 shows a further modification of the embodiment of FIG. 1. The main difference between the two embodiments is that the joint K' of FIG. 5 is formed by the auxiliary pressure generating device 16'. To this end, the plunger 19' of the device 16' has a spherical head 29' whose surface (guide face) 30' cooperates with the internal surface (guide face) 28' of the bearing element 7', namely, with the surface bounding the cylinder chamber 22'. The diameter of the spherical head 29' equals or very closely approximates the diameter of the cylinder chamber 22'. Thus, the two guide faces or surfaces 28' and 30' are not separate or distinct from the pressure generating means but are provided on or in the components of an auxiliary pressure generating device (16'). In all other respects, the structure of FIG. 5 matches that which is illustrated in FIG. 1.

Referring to FIG. 6, there is shown a combination of two rolls 51 and 52 which respectively correspond to the rolls 1 and 2 of FIG. 1. The hollow cylindrical shell 53 of the lower roll 51 surrounds the aforementioned stationary carrier 54 whose end portions are installed in pivot bearings 57, 58. These pivot bearings are respectively installed in upright frame members 55 and 56. The roll 51 further comprises two rows of aligned bearing elements 59 and 60. The bearing elements 59 are disposed between the carrier 54 and the uppermost part of the shell 53, and the bearing elements 60 are disposed diametrically opposite the bearing elements 59, i.e., between the carrier 54 and the lowermost portion of the shell 53. In the embodiment of FIG. 6, the shell 53 confines a row consisting of eight equidistant or nearly equidistant upper bearing elements 59 and a row of eight equidistant or nearly equidistant bearing elements 60. Each bearing element 59 can be installed directly opposite an element 60. The details of a bearing element 59 and of the nearest bearing element 60 are shown in FIG. 7.

Each bearing element 59 is biased toward the internal surface 53a of the shell 53 by a main or primary pressure generating device 61 and by one of two auxiliary or secondary pressure generating devices 62, 63. The devices 61–63 respectively comprise plungers 64, 65, 66 which are fixedly anchored in the carrier 54 and cylinder chambers 67, 68, 69 machined into the underside of the corresponding bearing element 59. The carrier 54 is formed with channels 70, 71 and 72 for admission of pressurized fluid to the cylinder chambers 67, 68 and 69 so that each of these chambers can receive fluid at a different pressure. The details of means for supplying pressurized fluid to the channels 70–72 are not specifically shown in FIG. 6 or 7; it suffices to say that each supplying means may comprise a discrete source of pressurized fluid and means for regulating the pressure of fluid which flows through the respective channel. Alternatively, all of the channels 70–72 can be connected with a common source of pressurized fluid and each of these channels then contains suitable shutoff valve means and suitable adjustable flow restrictor means or pressure regulating valve means to enable an attendant or an automatic control system to adjust the pressure in each of the cylinder chambers 67–69 independently of the pressure in the other cylinder chamber or chambers.

FIG. 6 shows that the row of bearing elements 59 is subdivided into three groups a, b and c wherein each of the groups a, c contains three neighboring bearing elements 59 and the median group b contains two such bearing elements. The cylinder chambers 67 of each group receive pressurized fluid from a common source, and the same holds true for the cylinder chambers 68 and 69 of each group. In other words, the cylinder chambers of all eight bearing elements 59 can receive pressurized fluid from nine (instead of twentyfour) sources. The manner of supplying pressurized fluid to the cylinder chambers of the pressure generating devices 73, 74 75 which operate between the lower bearing elements 60 and the carrier 54 is analogous. The corresponding channels in the carrier 54 are respectively shown at 76, 78 and 77. Each pressure generating device 73 constitutes a main or primary pressure generating means, and the devices 74, 75 constitute auxiliary or secondary pressure generating means.

Each of the bearing elements 59 and 60 is provided with a joint K which enables such bearing element to pivot relative to the carrier 54 (when necessary) in a manner and for the purposes as described in connection with the previously discussed embodiments of the improved roll. The joints K are analogous to that of FIG. 1a except that the spheres are secured to the respective bearing elements 59, 60 and the sockets for such spheres are machined into the carrier 54. In other words, two guide faces of each joint K are located within the confines of the carrier 54. Such joints render it possible to omit the customary antifriction bearings between the end portions of the shell 53 and the carrier 54, i.e., the bearing elements 59, 60 constitute the sole support for the shell 53. All that is necessary is to provide stops 79 (see FIG. 6) which hold the shell 53 against axial movement relative to the carrier 54. These stops may constitute split rings which are recessed into grooves machined into the internal surface 53a of the shell 53 and the split rings are outwardly adjacent to the outermost bearing elements 59 and 60.

An advantage of the roll of FIGS. 6 and 7 is that the stabilizing effect upon the shell 53 is more satisfactory than the stabilizing effect upon the shell 4. This is due to the fact that the shell 53 is acted upon by two sets of bearing elements 59, 60 which are disposed diametrically opposite each other. Moreover, and as already mentioned above, the provision of two rows or sets of bearing elements renders it possible to utilize the bearing elements as the sole means for supporting the shell 53, i.e., the end portions of the shell need not be mounted on or in antifriction bearings, friction bearings or analogous supports. Consequently, the shell 53 is much less likely to be deformed than a shell whose ends are mounted in or on bearings because the force Q will tend to shift the entire shell but will be incapable of flexing or bending the median portion of the shell. The just discussed feature of the roll 51 of FIGS. 6–7, i.e., the absence of bearings for the end portions of the shell 53, allows for at least some shifting of the nip between the shell 53 and the corresponding complementary roll 52 because the shell 53 does not undergo any deformation, i.e., the width of the gap between the shell 53 and the roll 52 remains constant even if the shell 53 is caused or allowed to move sideways, for example, in response to intentionally generated tilting stresses by the fluid in the cylinder chamber of one of the auxiliary pressure generating devices.

FIG. 8 shows a portion of a roll wherein the shell 80 surrounds a stationary carrier 81 and is centered by a bearing element 82 with a hydrostatic seal between the convex outer surface 82a of the bearing element and the cylindrical internal surface 80a of the shell 80. The bearing element 82 is biased against the internal surface 80a by a primary pressure generating device 83 or 84 and a secondary or auxiliary pressure generating device 84 or 83. These devices flank a joint K whose axis is located in the pressure plane 13 including the axis of the shell 80 as well as the axis of the cooperating complementary roll, not shown. The devices 83, 84 respectively comprise plungers 85, 86 which are fixedly anchored in the carrier 81 and extend with clearance into cylinder chambers 87, 88 machined into the underside of the bearing element 82. The joint K of FIG. 8 comprises an elongated strip-shaped member 89 which extends in parallelism with the axis of the shell 80 and has convex guide faces 90 contacting and slidable relative to flat parallel guide faces 91 machined into an elongated socket or groove in the underside of the bearing element 82. The planes of the guide faces 91 are parallel to the pressure plane 13. It is clear that the joint K of FIG. 8 can be replaced with a joint which comprises a sphere on the bearing element or on the carrier and a complementary socket in the carrier or in the bearing element.

Figure 9:
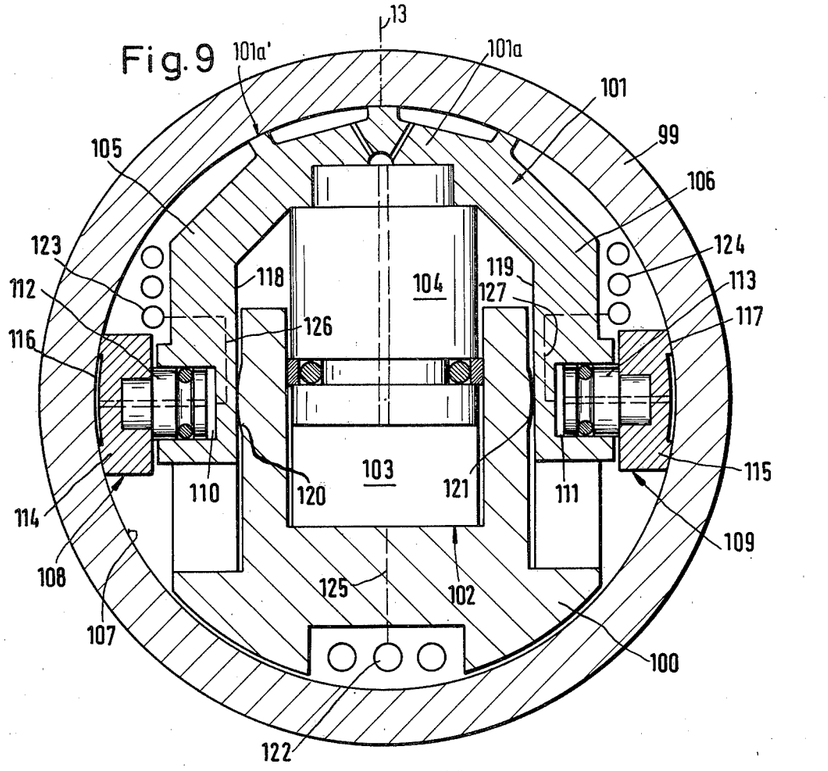
FIG. 9 is a transverse vertical sectional view of a further roll wherein the bearing element comprises several sections including a main section and two arms which flank the carrier and support auxiliary pressure generating devices.

In the embodiment of FIG. 9, the roll comprises a hollow cylindrical shell 99, a carrier 100 which is spacedly surrounded by the shell 99 and a bearing element 101 which is interposed between the carrier and the shell. The means for biasing the first or main section 101a of the bearing element 101 against the cylindrical internal surface 107 of the shell 99 comprises a main or primary pressure generating device 102 having a large-diameter plunger 104 anchored in the bearing element section 101a and extending into a cylinder chamber 103 of the carrier 100. The axis of the plunger 104 is located in the pressure plane 13. The main section 101a is integral with two arms 105, 106 which flank the carrier 100 and respectively support the auxiliary pressure generating devices 108, 109. The devices 108, 109 respectively comprise plungers 112, 113 which are anchored in discrete further sections 114, 115 of the bearing element 101 and cylinder chambers 110, 111 machined into the outer sides of the respecive arms 105, 106.

The arms 105, 106 are respectively formed with flat parallel guide faces 118, 119 cooperating with convex guide faces 120, 121 on the adjacent portions of the carrier 100. The guide faces 120, 121 may constitute portions of spherical surfaces. The guide faces 118, 119, 120 and 121 together constitute a joint which enables the bearing element 101 to pivot relative to the carrier 100 about at least one axis which is parallel to the axis of the shell 99.

FIG. 9 further shows conduits 122 which can supply pressurized fluid to the primary pressure generating device 102. The conduits 123 serve to supply pressurized fluid to the device 108, and the conduits 124 serve to supply pressurized fluid to the device 109. The mode of operation of the pressure generating devices 102, 108, 109 is the same as described in connection with the pressure generating devices 14–16 of the roll 1 shown in FIG. 1, i.e., each of the devices 102, 108, 109 can receive fluid at a pressure which deviates from the pressure of fluid in the other pressure generating device or devices. The connections (e.g., channels or bores) between the conduits 122, 123, 124 and the cylinder chambers 103, 110, 111 are respectively shown by broken lines, as at 125, 126 and 127.

If the shell 99 of FIG. 9 is subjected to the action of a tangential force which acts in a direction to the right, as viewed in FIG. 9, the auxiliary pressure generating device 108 is activated to counteract such force. Moreover, the activated pressure generating device 108 ensures that the force which it applies is always directed against one and the same portion of the shell 99 (i.e., at the same level) regardless of whether or not the shell has been shifted sideways or flexed in the middle by the tangential force acting in a direction to the right, as viewed in FIG. 9. The auxiliary pressure generating device 109 is rendered operative if the transverse or tangential force acts in a direction to the left, as viewed in FIG. 9.

The reference characters 116 and 117 respectively denote the convex outer surfaces of the sections 114, 115; these outer surfaces are adjacent to the internal surface 107. The axes of the auxiliary pressure generating devices 108, 109 extend radially of the shell 99.

The axis of the primary pressure generating device 102 is located in the pressure plane 13. The axes of the pressure generating devices 108, 109 are disposed in a plane which is normal to the plane 13 and includes the axis of the shell 99.

The outer surface of the bearing element 101 can be said to include a first portion 101a' on the main section 101a and at least one second portion 116 or 117 on a second section 114 or 115 of the bearing element 101. The primary pressure generating device 102 operates between the section 101a and the carrier 100, the auxiliary pressure generating device 108 operates between the sections 101a, 114 (and more specifically between the arm 105 of the section 101a and the section 114) to urge the surface portion 116 against the internal surface 107, and the other auxiliary pressure generating device 109 operates between the main section 101a and the section 115 (and more specifically between the section 115 and the arm 106 of the main section 101a) to urge the surface portion 117 against the internal surface 107.

It will be noted that the auxiliary pressure generating devices 108, 109 are remote from the primary pressure generating device 102. Since the devices 108, 109 are supported by the extensions or arms 105, 106 of the first or main section 101a of the bearing element 101, and since the axes of the devices 108, 109 extend radially of the shell 99, relatively low fluid pressure in the cylinder chamber 110 or 111 suffices to oppose the force Q, i.e., to generate a tilting moment which opposes the tilting moment produced by the force Q, and to simultaneously prevent deformation or shifting of the shell 99. It has been found that the operation of the auxiliary pressure generating devices 108, 109 is particularly satisfactory if their axes are disposed in a plane which is normal to the pressure plane 13 and includes the axis of the shell 99.

The mounting of the auxiliary pressure generating devices 108, 109 in such a way that they are supported by the arms 105, 106 of the main section 101a of the bearing element 101 and urge the sections 114, 115 of the bearing element against the internal surface 107 of the shell 99 also contributes to the generation of a satisfactory force which opposes the tangential force Q. Since the devices 108, 109 are remote from the primary pressure generating device 102 and are mounted on the arms 105, 106 of the main section 101a of the bearing element 101, the regions of contact between the surface portions 116, 117 and the internal surface 107 do not change even if the shell 99 is flexed by the force P so that it moves the main section 101a downwardly, as viewed in FIG. 9. This contributes to predictability of the loci of application of forces which are generated by the device 108 or 109.

Figure 10:
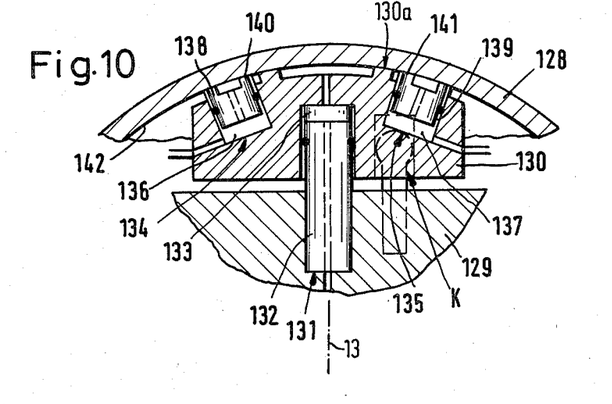
FIG. 10 is a fragmentary transverse vertical sectional view of an additional roll wherein the axes of the auxiliary pressure generating devices are disposed radially of the shell, the same as in the embodiment of FIG. 9.

FIG. 10 shows a portion of a further roll wherein the shell 128 has a cylindrical internal surface 142 and surrounds a stationary carrier 129 as well as a bearing element 130. The primary pressure generating device 131 of the embodiment which is shown in FIG. 10 comprises a plunger 132 which is anchored in the carrier 129 and extends into a cylinder chamber 133 machined into the underside of the bearing element 130. The structure of FIG. 10 further comprises two auxiliary pressure generating devices 134, 135 which flank the primary pressure generating device 131 and whose axes extend radially of the shell 128, i.e., the axes of the devices 134, 135 are not parallel to the axis of the device 131 and to the pressure plane 13. The auxiliary pressure generating devices 134, 135 respectively comprise plungers 138, 139 having exposed outer end faces 140, 141 which bear against the internal surface 142 of the shell 128. The plungers 138, 139 respectively extend into cylinder chambers 136, 137 machined into the outer surface 130a of the bearing element 130.

The joint K of FIG. 10 corresponds to that which is shown in FIG. 1a.

The purpose of the auxiliary pressure generating devices 134, 135 is the same as that of the devices 15, 16 shown in FIG. 1, i.e., these auxiliary pressure generating devices can generate forces which counteract tangential forces acting upon the shell 128.

Figure 11:
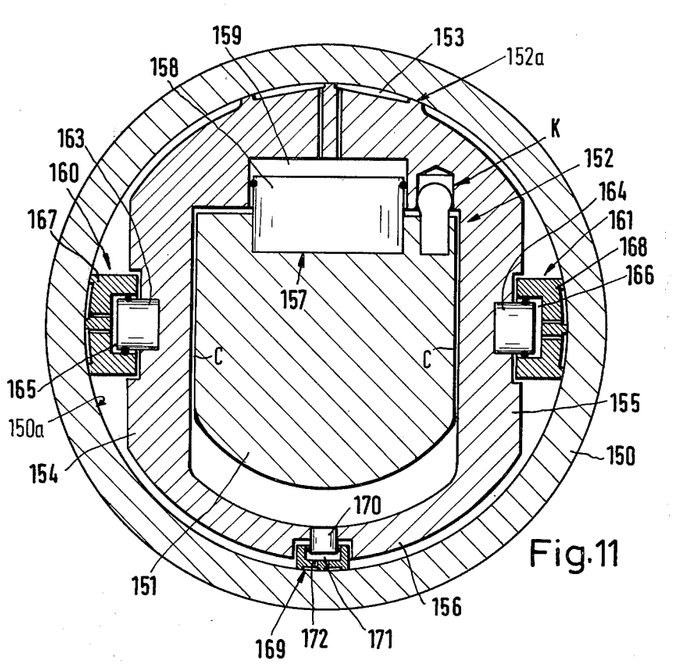
FIG. 11 is a transverse vertical sectional view of a roll wherein an annular bearing element surrounds the carrier and which comprises an additional pressure generating device serving to rapidly move the shell away from the cooperating complementary roll.

Referring to FIG. 11, there is shown a roll having a hollow cylindrical shell 150, a stationary carrier 151 and an annular bearing element 152 which surrounds the carrier 151 and is confined in the interior of the shell. The bearing element 152 has a first or main section which is disposed between the upper side of the carrier 151 and the adjacent portion of the internal surface 150a of the shell 150. Furthermore, the bearing element 152 comprises two further sections or arms 154, 155 which flank the carrier 151 and a section or web 156 which connects the lower end portions of the arms 154, 155 and is disposed between the underside of the carrier 151 and the respective portion of the internal surface 150a. The joint K of FIG. 11 corresponds to the joint of FIG. 1a. The roll of FIG. 11 further comprises a main or primary pressure generating device 157 having a large-diameter plunger 158 anchored in the carrier 151 and extending into a cylinder chamber 159 machined into the underside of the main section of the bearing element 152. Still further, the roll of FIG. 11 comprises two auxiliary or secondary pressure generating devices 160, 161 which operate between the arms 154, 155 and sections 167, 168 of the bearing element 152. The pressure generating devices 160, 161 respectively comprise plungers 163, 164 which are anchored in the respective arms 154, 155 and extend into cylinder chambers 165, 166 machined in the respective sections 167, 168 of the bearing element 152.

An additional pressure generating device 169 is disposed between the web 156 and a further section 172 of the bearing element 152. This additional pressure generating device 169 comprises a plunger 170 anchored in the web 156 and extending into a cylinder chamber 171 of the section 172.

The clearances C between the side faces of the carrier 151 and the inner sides of the arms 154, 155 allow for some tilting of the bearing element 152 relative to the carrier. The auxiliary pressure generating devices 160 and 161 can be said to constitute functional equivalents of the auxiliary pressure generating devices 15 and 16 shown in FIG. 1 or of the pressure generating devices 108, 109 shown in FIG. 9. By operating the additional pressure generating device 169, an attendant can rapidly move the shell 150 downwardly, as viewed in FIG. 11, so as to separate the shell from the cooperating complementary roll (not shown in FIG. 11 but corresponding to the roll 2 of FIG. 1).

The reference character 153 denotes one of the recesses in the outer surface 152a of main section of the bearing element 152.

Figure 12:
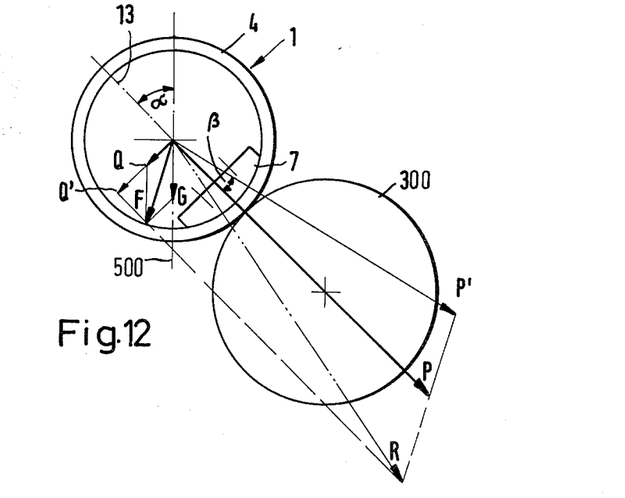
FIG. 12 is a diagrammatic view of two cooperating rolls whose axes are not located in a common vertical plane and further showing the forces which develop as a result of such mounting of the rolls as well as the forces which are generated to counteract undesirable shifting and/or deformation of the shell in that roll which embodies the invention.

FIG. 12 illustrates the forces which develop when the pressure plane 13 is inclined to the vertical. The roll 1 of FIG. 12 corresponds to the similarly referenced roll shown in FIG. 1 except that the orientation or angular position of the bearing element 7 is changed because the line of contact between the shell 4 and a complementary roll 300 is located midway between the three and six o'clock positions (with reference to the roll 1). Thus, the angle alpha between the pressure plane 13 (which is common to the axes of the rolls 1, 300) and a vertical plane 500 which includes the axis of the roll 1 equals 45 degrees. The reference character Q again denotes the transverse force which develops as a result of frictional engagement between the web W (not shown in FIG. 12) and the roll 1. This force is augmented by the force G representing the weight of the roll 1. The resultant of the forces Q and G is shown at F. The component Q' of the resultant force F is greater than the force Q, and the direction of action of the component Q' is the same as that of the transverse force Q, i.e., at right angles to the pressure plane 13. If the force F is added to the force P denoting the pressure between the rolls 1 and 300, the resultant force R acts upon the shell 4 of the roll 1 and causes or could cause undesirable deformation and/or shifting of the shell.

In accordance with the invention, the roll 1 is provided with the aforediscussed means for generating a force P' which makes an angle beta with the direction of action of the force P and compensates for the presence of the force F in such a way that the resultant of the forces P' and F furnishes a desirable force P acting in the pressure plane 13. The force P' is generated in response to admission of pressurized fluid to at least two pressure generating devices, e.g., to the devices 14, 15 or 14, 16 of FIG. 1. As explained hereinbefore, such simultaneously operated pressure generating devices are angularly offset with reference to each other, as considered in the circumferential direction of the shell. This holds true for each and every embodiment of the present invention. Moreover, the pressure of fluid in one of at least two simultaneously operated pressure generating devices need not and often should not match the pressure of fluid in the other pressure generating device.

It will be noted that the improved roll is provided with a novel and improved supporting, guiding and stabilizing system which can prevent or compensate for deformation and/or shifting of the shell of a roll wherein the shell surrounds a stationary carrier and at least one bearing element which is interposed between the carrier and the shell. The improved system is particularly suited to counteract lateral shifting of the shell and/or deformation (flexing) of the median portion of the shell (if the end portions of the shell surround friction or antifriction bearings on the carrier). This, in turn, contributes to predictability of the position and configuration of the nip between the improved roll and the cooperating complementary roll so as to achieve a more satisfactory treatment of running paper webs or the like for extended periods of time. In other words, the improved roll renders it possible to more accurately control the forces which act upon successive increments of the running web in the nip between such roll and the associated complementary roll. Moreover, it is possible to accurately counteract the force P, i.e., the force which presses the improved roll against the complementary roll or against the web in the nip between such rolls, the just mentioned force acting in the pressure plane 13 which is common to the axes of the two rolls. The force P is normally compensated for by the main or primary pressure generating device or devices.

Another important advantage of the improved roll is that, owing to simultaneous operation of several pressure generating devices which are angularly offset with reference to each other, as considered in the circumferential direction of the shell, the orientation of the bearing element or elements cannot be changed to such an extent that it could cause jamming of the shell and/or other damage. In other words, spatial orientation of the bearing element or elements remains substantially unchanged. Furthermore, and since the orientation of the outer surface of a bearing element relative to the internal surface of the shell can remain unchanged or can be controlled and maintained within a narrow range of acceptable positions, the hydrostatic seal or seals between the outer surface of the bearing element and the internal surface of the shell operate more satisfactorily than in heretofore known rolls and the quantities of pressurized fluid which are permitted to leak from the hydrostatic seal or seals are only a small fraction of leak fluid that escapes from hydrostatic seals in conventional rolls.

Still another advantage of the improved roll is that the quantity of heat which is generated as a result of deformation (if any) of the roll is but a small fraction of the heat energy which develops when a conventional roll is in use. This holds true regardless of whether or not the end portions of the shell are mounted on bearings, i.e., regardless of whether the force Q or Q' tends to shift the entire shell sideways or merely tends to flex the median portion of the shell. A reduction of the generation of heat reduces the likelihood of excessive heat-induced expansion and thus contributes to longer useful life of the roll.

As mentioned above, the admission of pressurized fluid to the main and/or auxiliary and/or additional pressure generating devices can be effected manually or by resorting to a more or less sophisticated automatic control system, for example, by resorting to suitable sensors and monitoring devices which respectively detect changes in the position of portions of or the entire shell and/or changes in the pressure of fluid in various pressure generating devices. The exact nature of such sensors and monitoring means forms no part of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A pressure applying roll for use in calenders or the like to define with a parallel complementary roll a nip for the passage of webs of paper, textile or other material, comprising a hollow cylindrical rotary shell having an internal surface; a stationary carrier extending through and spacedly surrounded by said shell; bearing means including at least one bearing element interposed between said carrier and said shell and having a second surface complementary to and adjacent to said internal surface; a plurality of fluid-operated pressure generating devices including first and second devices, said devices being operable to urge said second surface against said internal surface and said first and second devices being spaced apart from each other, as considered in the circumferential direction of said shell; and means for operating said devices including means for supplying to each of said devices pressurized fluid at a selected pressure, said operating means including means for supplying fluid to said first device at at least one first pressure and means for supplying fluid to said second device at at least one second pressure which is different from said first pressure.

2. The pressure applying roll of claim 1, further comprising hydrostatic seal means interposed between said surfaces.

3. The pressure applying roll of claim 1, wherein said second surface extends well beyond said devices, as considered in the circumferential direction of said shell.

4. The pressure applying roll of claim 1, wherein said devices include hydraulic cylinder chambers and plungers reciprocably extending into the respective chambers.

5. The pressure applying roll of claim 1, wherein said carrier has a first guide face and said bearing element has a second guide face cooperating with said first guide face to counteract forces acting upon said pressure applying roll substantially tangentially of said shell.

6. The pressure applying roll of claim 5, wherein said guide faces form part of a joint defining for said bearing element a pivot axis which is parallel to the axis of said shell.

7. The pressure applying roll of claim 6, wherein one of said guide faces is substantially flat and the other of said guide faces is curved.

8. The pressure applying roll of claim 6, wherein one of said guide faces is a spherical surface and the other of said guide faces is a cylindrical surface.

9. The pressure applying roll of claim 5, wherein said guide faces are distinct from said devices.

10. The pressure applying roll of claim 5, wherein said guide faces are disposed within the confines of said bearing element.

11. The pressure applying roll of claim 10, wherein said bearing element has a socket bounded by a surface which constitutes said second guide face and said carrier includes an extension projecting into said socket and having a spherical surface constituting said first guide face.

12. The pressure applying roll of claim 5, wherein said bearing element has spaced-apart first and second arms flanking said carrier and having parallel first and second inner surfaces adjacent to said carrier, said carrier having convex first and second surfaces respectively contacting said first and second inner surfaces, said convex surfaces together constituting said first guide face and said inner surfaces together constituting said second guide face.

13. The pressure applying roll of claim 12, wherein said convex surfaces are spherical surfaces.

14. The pressure applying roll of claim 1, wherein said first and second devices are mirror symmetrical to each other with reference to a plane including the axis of said shell.

15. The pressure applying roll of claim 1, wherein the axes of said shell and the complementary roll are disposed in a common pressure plane, said first device having an axis disposed in said plane and said second device being disposed at one side of said plane.

16. The pressure applying roll of claim 1, wherein said devices further include a third device and said first device is disposed between said second and third devices, as considered in the circumferential direction of said shell.

17. The pressure applying roll of claim 16, wherein the axes of said shell and the complementary roll are disposed in a common pressure plane and said first device has an axis located in said plane, said second and third devices being mirror symmetrical to each other with reference to said plane.

18. The pressure applying roll of claim 1, wherein said devices are parallel with and closely adjacent to each other.

19. The pressure applying roll of claim 1, wherein said second device is remote from said first device, as considered in the circumferential direction of said shell, and extends substantially radially of said shell.

20. The pressure applying roll of claim 19, wherein said bearing element includes a first section for a part of said first device and an arm extending from said first section substantially circumferentially of said shell and supporting a part of said second device.

21. The pressure applying roll of claim 20, wherein said bearing element further includes a second arm, said arms flanking at least a portion of said carrier and extending from the opposite sides of said first section, as considered in the circumferential direction of said shell, said devices further including a third device mounted on said second arm.

22. The pressure applying roll of claim 21, wherein the axes of said shell and the complementary roll are disposed in a first plane and said first device has an axis located in said plane, said second and third devices having axes located in a second plane which is normal to said first plane.

23. The pressure applying roll of claim 22, wherein said second plane includes the axis of said shell.

24. The pressure applying roll of claim 1, wherein said bearing element includes a first section and a second section, said first and second sections respectively having first and second portions of said second surface, said first device being installed between said carrier and said first section to urge said first portion of said second surface against said internal surface and said second section being disposed between said first section and said shell, said second device being installed between said first and second sections and being operable to urge said second portion of said second surface against said internal surface.

25. The pressure applying roll of claim 1, wherein each of said devices comprises a fluid-containing cylinder chamber and a plunger reciprocable in the respective chamber, the diameter of the chamber of said first device exceeding the diameter of the chamber of said second device.

26. The pressure applying roll of claim 25, wherein the axes of said shell and the complementary roll are disposed in a common plane and said first device has an axis in said plane.

27. The pressure applying roll of claim 1, wherein said first device includes several neighboring fluid-containing cylinder chambers and plungers reciprocable in the chambers.

28. The pressure applying roll of claim 27, wherein said chambers have parallel axes located in a plane which includes the axis of said shell.

29. The pressure applying roll of claim 1, wherein said bearing means further comprises a second bearing element interposed between said carrier and said shell substantially diametrically opposite said first mentioned bearing element, said second bearing element having a third surface adjacent to said internal surface, and further comprising additional fluid-operated pressure generating devices for urging said third surface against said internal surface and means for operating said additional devices at different pressures and independently of each other, said additional devices being spaced apart from each other, as considered in the circumferential direction of said shell.

30. The pressure applying roll of claim 1, wherein said bearing means constitutes the sole support for said shell.

31. The pressure applying roll of claim 1, wherein said bearing element is an annulus surrounding said carrier within said shell and further comprising an additional pressure generating device installed in said element substantially diametrically opposite said first device and operative to move said shell away from the complementary roll.

32. The pressure applying roll of claim 31, wherein said additional device includes a first portion which bears against said internal surface and a second portion movable relative to said first portion and secured to said bearing element.

* * * * *